United States Patent [19]

Kensrue et al.

[11] 4,158,315

[45] Jun. 19, 1979

[54] TRACK GUIDED CARRIAGE UNIT

[76] Inventors: Milo M. Kensrue, 56 Linda Isle, Newport Beach, Calif. 92660; Donald L. Martin, 12132 Woodlawn Ave., Santa Ana, Calif. 92705

[21] Appl. No.: 863,708

[22] Filed: Dec. 23, 1977

[51] Int. Cl.² ............................................. F16H 19/04
[52] U.S. Cl. .......................................... 74/31; 266/67; 266/71; 83/440.1; 173/32; 74/499
[58] Field of Search ....................... 266/71, 67; 238/1; 83/265, 440.1; 74/30, 31, 477; 173/32

[56] References Cited

U.S. PATENT DOCUMENTS

| | | | |
|---|---|---|---|
| 1,867,047 | 7/1931 | Anderson | 266/71 |
| 2,187,731 | 1/1940 | Davis | 266/71 |
| 2,311,223 | 2/1943 | Geibig | 266/67 |
| 2,542,846 | 2/1951 | Trombetta | 266/67 |
| 3,230,781 | 12/1966 | Dubilier | 74/30 |
| 3,485,306 | 12/1969 | Gulley | 266/67 |
| 4,054,179 | 10/1977 | Destree | 266/71 |

*Primary Examiner*—Carroll B. Dority, Jr.
*Assistant Examiner*—G. A. Anderson
*Attorney, Agent, or Firm*—Whann & McManigal

[57] ABSTRACT

A track guided carriage unit for selectively supporting a variety of work performing devices, tools and the like for movement along a predetermined working path, in which a supporting platform has spring loaded wheels that are releasably clamped by a manually operable handle into and out of engagement with opposed surfaces of a guide track, and wherein a motor driven pinion has adjustable meshing relation with a linear rack extending along the track, the pinion being operative to advance the platform at a predetermined rate of guided movement along the work path.

23 Claims, 5 Drawing Figures

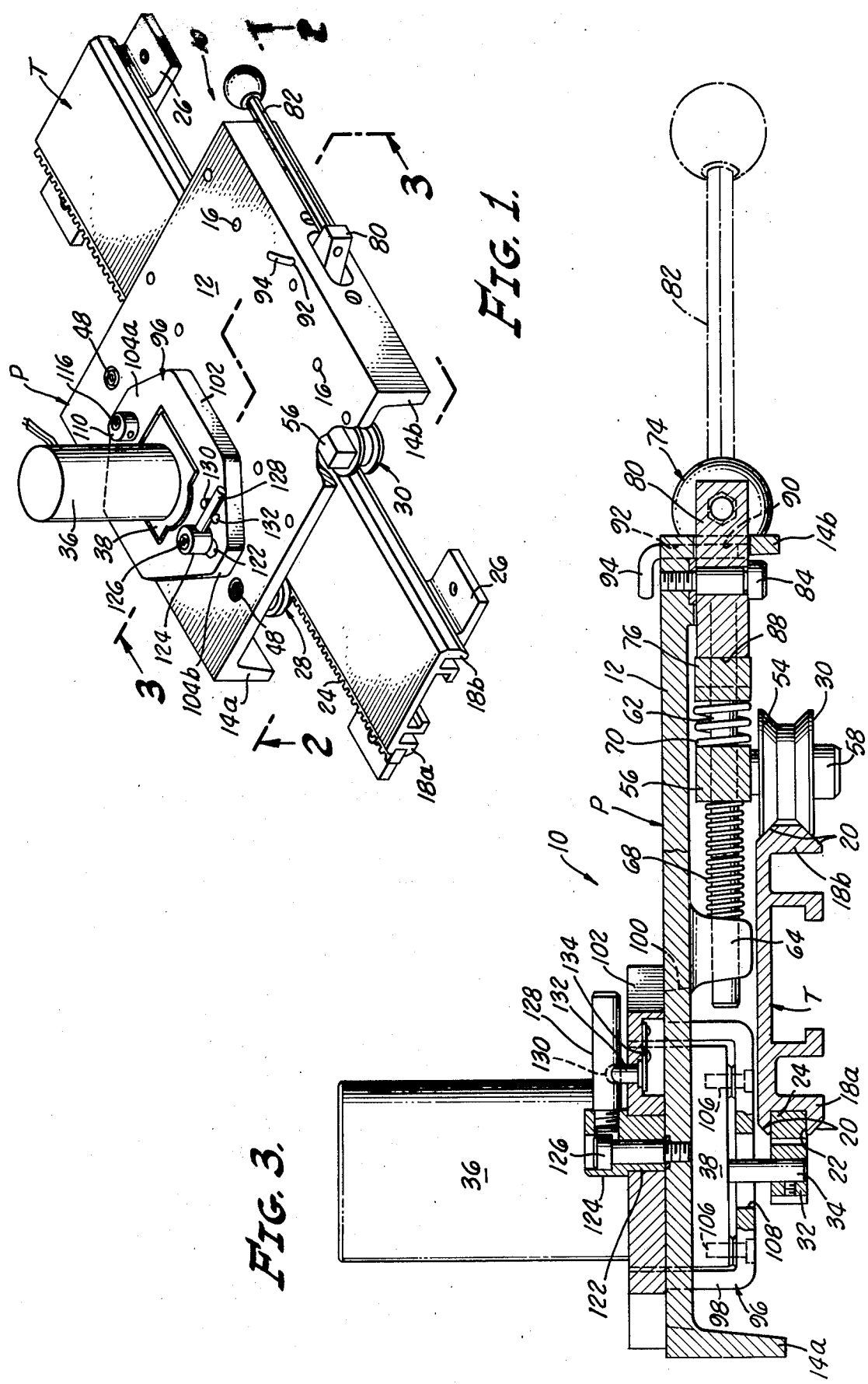

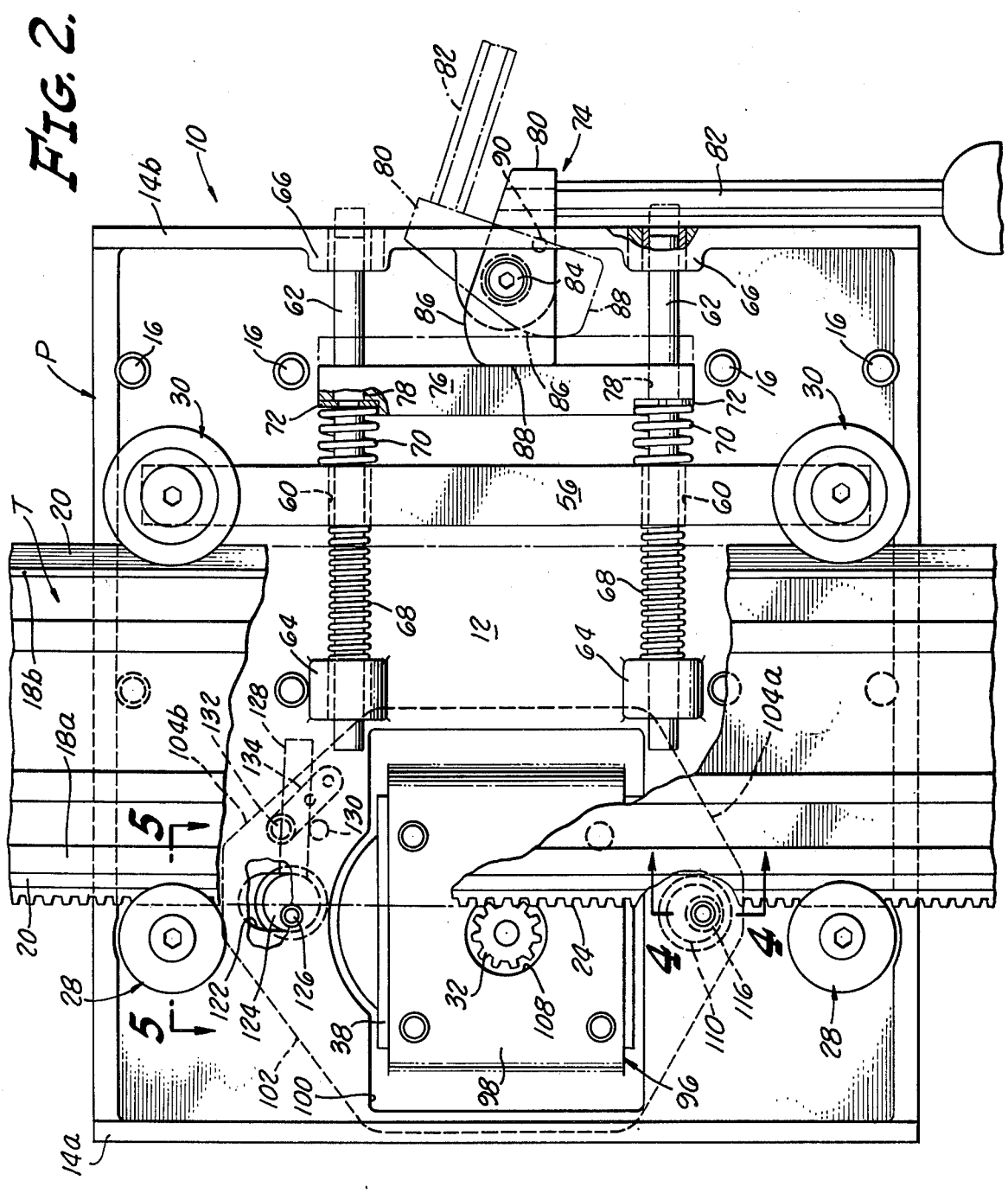

TRACK GUIDED CARRIAGE UNIT

PRIOR ART

It has heretofore been known generally in the prior art to provide in work performing apparatus and machines such as lathes, welding equipment, metal cutting equipment, and the like, built-in track guided carriages for a particular type of tool or tools as required for the particular apparatus. These carriages have, however, in the main been designed as structural components of the apparatus or machine. Examples of such prior art known to applicants are the following U.S. Pat. Nos.

3,226,027—Dec. 28, 1965
3,417,979—Dec. 24, 1968
3,656,364—Apr. 18, 1972
3,713,637—Jan. 30, 1973

BACKGROUND OF THE INVENTION

The present invention relates generally to work performing apparatus and machines.

It has been generally known heretofore from the above listed prior art patents to provide apparatus for the performance of work operations, wherein tools and the like are supported on movable guided carriages, these carriages being in the main fabricated as a part of the machine or apparatus, and designed for the mounting and guiding of the particular tool or tools required for that machine or apparatus.

According to the present invention, it is proposed to provide the guided carriage as a separate device or assembly that is susceptible of a wide variety of applications and uses permitting the selective mounting and guiding of a variety of working tools, devices and the like thereon for movement along a working path. For example, the guided carriage may be utilized at one time to support a grinder, and at another time it may be utilized to support a welding head or an entirely different type of tool.

SUMMARY OF THE INVENTION

Having in mind the inherent disadvantages and inadaptability of the known prior art structures for accomplishing the purposes of the present invention, it is one object to provide an improved track guided carriage which can be selectively associated with a variety of workpieces, and which is adapted for the selective mounting of a variety of work performing devices thereon for simultaneous or successive operating movements along a predetermined working path.

A further object is to provide an improved track for a guided carriage structure, which will provide accurate alignment of an appropriate carriage with respect to two axes, and in which a longitudinally extending toothed rack mounted in an edge groove between opposed V-surfaces on opposite sides of the rack, is arranged for engagement by a toothed driving pinion on the carriage to control the position of the carriage with respect to a third axis.

Another object is to provide an improved carriage arrangement in which a carriage platform is mounted for movement along a guide track, in which carriage supporting wheels releasably engage with opposed track surfaces, and in which the wheels have spring loaded engagement with the track. Such an arrangement is particularly advantageous over conventional arrangements employing eccentrically mounted wheels to fit the carriage to the track. By using spring loaded wheels, manufacturing tolerances and track wear are automatically compensated for without the necessity of factory or field adjustments.

The arrangement of the present invention is of particular advantage, when the carriage is utilized in connection with welding equipment, since the spring loaded wheels will readily enable them to pass over any weld spatter that may occasionally stick to the track surfaces that are engaged by the carriage supporting wheels.

Still another object of the present invention resides in the provision of an improved and effective clamping mechanism for releasably securing a carriage platform to and for movement along a guide track.

It is also an object to provide in a track guided carriage arrangement, unique means for adjusting the meshed engagement of a driving pinion, associated with power means mounted on the carriage, with a linear toothed rack mounted on the track.

Further objects of the invention will be brought out in the following part of the specification, wherein detailed description is for the purpose of fully disclosing the invention without placing limitations thereon.

BRIEF DESCRIPTION OF THE DRAWINGS

Referring to the accompanying drawings, which are for illustrative purposes only:

FIG. 1 is a perspective view of a track guided carriage unit embodying the features of the present invention;

FIG. 2 is an enlarged fragmentary bottom plan view, as seen generally along line 2—2 of FIG. 1, and showing the operative relationship of the clamping mechanism for the track engaging wheels, and the driving connection with the track;

FIG. 3 is a transverse sectional view, taken substantially on line 3—3 of FIG. 1;

FIG. 4 is an enlarged fragmentary sectional view, taken substantially on line 4—4 of FIG. 2, and showing the adjusting means for the platform driving pinion; and FIG. 5 is an enlarged fragmentary sectional view taken substantially on line 5—5 of FIG. 2, and showing details of one of the track engaging guide wheel structures.

DESCRIPTION OF A PREFERRED EMBODIMENT

Referring now more specifically to the drawings, for illustrative purposes, there is shown in FIG. 1 a track guided carriage unit, as generally indicated by the numeral 10, which embodies the features of construction of the present invention. The unit is shown as comprising basically two associated structures, namely, a platform P and an operatively associated guide track T. The platform is shown as being fabricated from a channel section which provides a bridging wall 12 with depending side flanges 14a and 14b, the bridging wall 12 being provided with a multiplicity of holes or openings 16 to facilitate the mounting thereon of various tools, devices and work performing elements that are desired to be guided by the associated track T along a predetermined work performing path.

The track T may vary as to specific details of construction, but is preferably an elongate extruded or fabricated member provided with opposed edge flanges 18a and 18b and which are respectively formed with longitudinally extending laterally converging V-surfaces 20. In the case of the flange 18a, the V-surfaces 20 are separated by a longitudinally extending groove 22 in which a linear toothed rack 24 is appropriately seated with its toothed side being outwardly exposed along the track edge. The track is arranged for surface mounting on a workpiece or other member by conventional means. In the present instance, the track is shown as having mounting brackets 26 which are adapted to be bolted or otherwise secured to provide a fixed guide to control movement of the platform P and the work performing device thereon along a desired work path. Other known track mounting means may include clamps, magnets, suction cups and the like.

The platform P is arranged to transversely span the track T, and mounts on its underside a plurality of track-engaging wheels, such wheels being shown in FIG. 2 as comprising wheels 28, for engagement with the V-surfaces 20 associated with the flange 18a, and wheels 30 which are engageable with the V-surfaces 20 of the flange 18b. A driving pinion 32 carried by a vertically positioned drive shaft 34 has its teeth in meshed engagement with the teeth of the rack 24. A driving motor 36 drives the shaft 34 through a speed reducing gear box 38. The pinion 32 is positioned intermediately between the wheels 28.

With the platform P and associated track T arranged as described above, it will be apparent that the wheels 28 and 30 coact with the V-surfaces along the opposite edges of the track T to support the platform with respect to two axes, a vertical axis and a horizont axis, while the driving pinion 32 by virtue of its engagement with the rack 24 will control the position of the platform with respect to a third axis extending longitudinally of the track.

An important feature of the invention resides in the arrangement of the wheels 28 and 30 so as to be relatively movable into a clamped and non-clamped relation with the track, and so that in the unclamped position the platform may be bodily removed and separated from the track, together with the tools or other devices mounted thereon, as a unit.

In this connection, as best shown in FIG. 5, the wheels 28 are fixedly positioned with respect to the bridging wall 12 of the platform. Each wheel 28 is comprised of axially spaced end sections 28a and 28b, each of these sections being rotatably supported upon an anti-friction bearing 40, and these bearings being axially retained in spaced relation by a spacer sleeve 42. The spacer sleeve and the anti-friction bearings 40 are mounted upon a mounting bolt 44 having a head portion engaged with the anti-friction bearing 40 of the end section 28b, and its opposite end extending through a bore 46 of the bridging wall 12, this latter portion being threaded to receive a mounting nut 48. A thrust washer 50 is interposed between the anti-friction bearing 40 of the end section 28a and the adjacent surface of the bridging wall 12. With this arrangement, it will be seen that beveled peripheral surfaces 52, which are formed on the end sections 28a and 28b, will collectively engage the adjacent V-surfaces 20 on the opposite sides of the rack 24, and that the teeth of the rack will extend into the space between the end sections 28a and 28b to freely permit movement of the wheels 28 along the track.

As shown best in FIGS. 2 and 3, the wheels 30 are supported for relative movement towards and away from the wheels 28 into clamped and non-clamped relationship with the track, the wheels 30 having axially spaced V-surfaces 54 for operative engagement respectively with the V-surfaces 20 of the flange 18b, when the wheels are in clamped relation with respect to the track.

In this connection, the wheels 30 are respectively supported at the ends of an elongate clamping bar 56, each wheel 30 being rotatably supported upon a spindle 58 extending below the clamping bar. The clamping bar 56 is provided between its ends with spaced apart transverse bore passages 60 for receiving therethrough in spaced relation to the bore a guide rod 62. The guide rods 62 extend in parallel relation, and each rod is supported at its ends for axial sliding movement within an inner end bearing support 64 extending below the bridging wall 12, and an outer bearing support 66 formed on the side flange 14b of the platform. Each of the bearing supports may be fitted with a conventional sleeve bearing, if desired.

With respect to the mounting of the clamping bar 56 on each rod 62, the clamping bar is positioned between a coiled compression return spring 68 on one side and a heavier coiled compression loading spring 70 on an opposite side. The return spring 68 has one end engaged with the bearing support 64 and its other end engaged with the clamping bar 56, while the heavier loading spring 70 has one end engaged with the clamping and its other end engaged with a snap ring 72 affixed to the guide rod 62 and forming a fixed abutment thereon. As thus arranged, the return springs 68 provide a force which normally acts to move the clamping bar 56 and the wheels 30 thereon in a direction away from the track to a non-clamped position. The loading springs 70 are arranged to have a non-stressed condition, when the clamping bar 56 and the wheels 30 are moved into non-clamped relation with the track by means of manual actuating means 74, which will hereinafter be described in detail.

With the wheels 30 in clamped position with the track, the wheel engagement will be spring loaded, and due to the oversized spaced bores 60, the clamping bar 56 may be slightly tilted in the event that the wheel 30 should engage deflecting material which might be deposited on the associated V-surfaces 20 of the track. This is a particular advantage since manufacturing tolerances and track wear will be automatically compensated for without the necessity of factory or field adjustments, and will readily enable the wheels to pass over any weld spatter that might occasionally stick to the track surfaces that are engaged with the carriage supporting wheels.

The manual actuating means 74 includes an elongate thrust bar 76 having bridging relation with the spaced apart guide rods 62, the thrust bar having its ends respectively slidingly supported on the associated guide rod which extends through a transverse bore 78 at the end of the thrust bar 76. Thus, the thrust bar 76 is slidably supported and movable on the guide rods 62, and is arranged for inward and outward movements towards and away from the clamping bar 76 by means of a cam member 80 by means of a handle member 82, so as to act against the other side of the snap ring 72 and the springs 68 and 70 to move the wheels 30 into clamped and non-clamping relationship with the associated track. In the clamped position, the thrust bar 76 will have the position as shown in full lines in FIG. 2, and in the unclamped positions will be moved outwardly by the return springs 68 to the position shown in phantom lines. During these mvements, the guide rods 62 will be axially shifted in their supporting bearings.

The cam member 80 is pivoted between its ends for swinging movement on a pivot member 84 in the form of a bolt having threaded engagement with and depending below the bridging wall 12 of the platform. The outermost end of the cam 80 mounts the elongate handle 82 in right angled relation, while the inner end of the cam member is conformed to provide a lobe with a curved camming face 86 and a transverse flat face 88 which provides a dwell engagement with the thrust bar 76, for releasably retaining the cam in its operative position in which the wheels 30 will be clampingly engaged with the track. It will be apparent that during the swinging movement of the cam 80, by means of the handle 82, between the non-clamping and clamping positions, the camming surface 86 will operate to move the thrust bar 76 from the position shown in phantom lines to the position shown in full lines in FIG. 2. In the clamping position, it will be seen that the handle 82 extends in parallel relation along the adjacent edge of the platform.

As a safety measure, provision is made for releasably retaining the cam in its clamping position, and to prevent inadvertent movement of the handle 82 out of the position as shown in full lines in FIG. 2. For this purpose, the cam member 80 is provided with and opening 90 which is adapted in the clamping position of the handle 82 to register with an opening 92 formed in the bridging wall 12, and when these openings are in registration permit the insertion of a retaining pin 94 therein to prevent rotative movement of the cam member.

As a further feature of the invention, it will be appreciated that for effective use of the carriage unit, simple and effective means should be provided to permit adjustment in the field of the meshed relationship of the pinion 32 with the teeth of the rack 24 to permit optimum performance. In this connection, the motor 36, gear box 38 and driving pinion 32 are mounted in a cradle structure, as generally indicated at 96, this cradle being mounted for selective adjustable movements on the platform in a manner to facilitate accurate adjustment of the meshed relationship of the pinion 32 with the teeth of the rack 24. In this connection, the cradle is shown as being fabricated to provide a depending dished portion 98 which is adapted to be positioned within a suitably conformed opening 100 of the bridging wall 12, and when so supported have a peripheral rim flange 102 extend in overlying engagement with the upper surface of the wall 12. Preferably, the rim flange has parallel side edges and opposed longitudinally extending end portions 104a and 104b, as best shown in FIGS. 1 and 2. By reference to FIG. 3, it will be seen that the gear box 38 and connected motor 36 are positioned within the dished portion 98 and fixedly anchored therein by retaining screws 106 which extend through the bottom wall of the dished portion. As thus mounted, the drive shaft 34 extends through an opening 108 so as to position the pinion 32 in spaced relation below the dished portion.

The end portion 104a of the cradle structure is swingably mounted upon an eccentric pivot, as best shown in FIG. 4. More specifically, the end portion 104a is provided with a pivot member 110 of cylindrical configuration, and which is rotatably seated within a stepped bore 112 of the end portion 104a, the pivot member and bore having interengaged surrounding shoulder engagement as indicated at 114 for rotatably supporting the pivot and providing surfaces which may be secured in clamped and unclamped relationship by the action of a mounting bolt 116 wich extends through an off-axis bore 118 of the pivot member. The pivot member has an upper end which projects above the upper surface of the end portion 104a, this upper end being provided with a radial outwardly opening bore 120 for the endwise reception of an appropriate tool by means of which the pivot member may be rotated in the stepped bore 112 so as to eccentrically shift the pivot mounting of this end of the cradle in a manner to adjust the operative position of the pinion 32 in relation to the teeth of the rack 24.

For cooperative coaction with the eccentric pivot member 110, the opposite end portion 104b is provided with a camming arrangement for adjustably swinging the cradle about the pivot 110 between a pinion released position and a pinion operative position with respect to the rack 24. For this purpose, the end portion 104a is provided with an elongate slot 122 having its axis substantially coincident with the end surfaces of the teeth of the rack 24. A rotatable eccentrically pivoted cam 124 is disposed in this slot, the cam being rotatably mounted on a pivot 126 which is outwardly offset with respect to the axis of the slot 122. As shown in FIG. 1, the cam 124 is provided with a radially extending handle 128 by means of which the cam may be rotated from a stop position against a stop pin 130 for determining the operating position of the pinion 32 to a rotative position in which the pinion 32 will be disconnected with respect to the teeth of the rack 24. The handle is releasably retained against the stop pin by means of a spring urged detent pin 132, this pin being normally urged to a raised position by means of an appropriate leaf spring 134, as best shown in FIG. 3.

From the foregoing description and drawings, it will be clearly evident that the delineated objects and features of the invention will be accomplished.

Various modifications may suggest themselves to those skilled in the art without departing from the spirit of our invention, and, hence we do not wish to be restricted to the specific forms shown or uses mentioned, except to the extent indicated in the appended claims.

We claim:

1. A track guided carriage unit capable of selectively mounting and transporting a variety of work performing devices along a predetermined work path, comprising:
    (a) an elongated guide track having V-surfaces extending along its opposite sides and a longitudinally extending rack extending along the V-surfaces on one side of said track;
    (b) a main mounting platform transversely spanning said track and having a generally flat surface for the mounting of a work performing device thereon;
    (c) a plurality of platform supporting wheels carried by said platform, said wheels having V-surfaces for engaging the V-surfaces along the opposite sides of the track, the wheels for engaging the V-surfaces on said one side of the track comprising a pair of wheels having fixed axes of rotation, and the wheels for engaging the V-surfaces on the opposite side of the track comprising a pair of wheels supported for unitary movements towards and away from the track into clamped and non-clamped positions with respect to said track, and in the non-clamped position enabling separation of said platform from said track;
    (d) power driving means mounted on said platform including a driving pinion, positioned between said pair of wheels having the fixed axes of rotation, for operative engagement with said rack when the platform wheels are moved into clamped position with the track, and in which position the V-surfaces of the track and wheels coact to support the platform with respect to two axes, and the driving pinion coacts with said rack to control the position of the platform with respect to a third axis; and (e) loading spring means for urging said wheels towards their clamped positions with respect to said track.

2. A carriage unit as set forth in claim 1, in which said rack is positioned between the V-surfaces extending along said one side of the track.

3. A carriage unit as set forth in claim 1, in which the pair of wheels on said opposite side of the track are supported on a common movably mounted clamping bar;
the spring means normally biases the clamping bar in a direction away from said track; and
manually operable means moves the clamping bar in a direction against said spring means and to a position of engagement of the wheels thereon with said track.

4. A carriage unit as set forth in claim 3, in which loading spring means is interposed between said clamping bar and said manually operable means.

5. A carriage unit as set forth in claim 4, in which said manually operable means includes a cam supported for movement between positions in which said clamping bar is in a clamped position and a non-clamped position.

6. A carriage unit as set forth in claim 3, which includes
means for releasably securing the manually operable means in a position corresponding to the engagement of the wheels with the track.

7. A carriage unit as set forth in claim 5, in which a movably mounted thrust member is interposed between said cam and said loading spring means.

8. A carriage unit as set forth in claim 7, in which the thrust member comprises an elongate bar supported for lateral movements towards and away from said track; and
said cam has a flat surface engaged with an adjacent surface of said bar to provide a dwell for releasably retaining the manually operable means in a position corresponding to a clamped position of said clamping bar.

9. A carriage unit as set forth in claim 5, in which said cam is pivoted for operative rotative movements; and
an elongate actuating handle is connected to said cam, said handle in the clamped position of said clamping bar being adapted to extend in substantially parallel relation along an adjacent side of said platform.

10. A carriage unit as set forth in claim 4, in which the clamping bar is supported for movements towards and away from said track;
the movable wheels are rotatably supported at the opposite ends of the clamping bar; and
the return spring means is positioned to act outwardly on one side of the clamping bar, and the loading spring means is positioned to act inwardly on the opposite side of the clamping bar.

11. A carriage unit as set forth in claim 10, in which the support for the clamping bar is positioned between its ends.

12. A carriage unit as set forth in claim 11, in which the support for the clamping bar comprises a pair of laterally spaced rod members;
bearings support said rods for independent longitudinal axial movements; and
said clamping bar is provided with passages for respectively receiving said rods in spaced surrounding relation to permit limited longitudinal tilting of the clamping bar.

13. A carriage unit as set forth in claim 4, in which a pair of laterally spaced rods slidably support said clamping bar;
the return spring means comprises a pair of coiled springs respectively surrounding the rods on one side of the clamping bar and being operative to move the clamping bar away from said track; and
the loading spring means comprises a pair of coiled springs respectively surrounding the rods on the other side of the clamping bar and being operative to move the clamping bar toward said track.

14. A carriage unit as set forth in claim 13, which includes
a thrust bar bridging said rods and being slidably mounted thereon for lateral movement towards said clamping bar by the actuation of said manually operable means;
said loading springs being respectively positioned to extend between said clamping bar and said thrust bar and being activated to a stressed condition in response to said movement of the thrust bar towards said clamping bar.

15. A carriage unit as set forth in claim 14, in which said rods are supported on said platform for longitudinal axial movements;
the ends of the loading springs adjacent the thrust bar respectively being engaged with one side of a fixed abutment on each of said rods; and
said thrust bar being engageable with the other side of said abutment on each of said rods.

16. A carriage unit as set forth in claim 4, in which the loading spring means is in a non-stressed condition when the wheels on the clamping bar are disengaged from the track.

17. A carriage unit as set forth in claim 16, in which the loading spring means is stressed in response to the actuation of said manually operable means, subsequently to the engagement of the wheels on the clamping bar with the track.

18. A carriage unit as set forth in claim 1, in which said power driving means and said pinion are supported on said platform by mounting means for selective movements in directions to enable adjustment of the meshed relationship of the pinion with the rack on said track.

19. A carriage unit as set forth in claim 18, in which said mounting means comprises an elongate cradle on which the power driving means and pinion are mounted with their driving axis extending in right-angled relation to said platform;
a pivot at one end of said cradle supporting the cradle for swinging movement to adjust the operative position of said pinion; and
means at the opposite end of said cradle for releasably retaining said cradle in an adjusted position.

20. A carriage unit as set forth in claim 19, in which the pivot at said one end of said cradle is eccentrically adjustable.

21. A carriaage unit as set forth in claim 19, in which the means at the opposite end of said cradle comprises movable camming means for swinging the cradle about said pivot to move the pinion towards and away from the track rack.

22. A carriage unit according to claim 21, which includes means for releasably latching said camming means in an operative position of said pinion.

23. A carriage unit as set forth in claim 19, in which the means at the opposite end of said cradle comprises:
an elongate slot;
a cam member rotatably supported in said slot;
a handle for rotating said cam member; and
spring detent means for releasably retaining said handle in one position of rotation of said cam member.

* * * * *